United States Patent
Yashima

(10) Patent No.: US 9,131,074 B2
(45) Date of Patent: Sep. 8, 2015

(54) INFORMATION PROCESSING APPARATUS, PRINTING APPARATUS, PRINTING SYSTEM, AND COMPUTER-READABLE NON-TRANSITORY STORAGE MEDIUM

(71) Applicant: KYOCERA Document Solutions Inc., Osaka-shi, Osaka (JP)

(72) Inventor: Ayako Yashima, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/463,480

(22) Filed: Aug. 19, 2014

(65) Prior Publication Data

US 2015/0062630 A1 Mar. 5, 2015

(30) Foreign Application Priority Data

Aug. 28, 2013 (JP) .................................. 2013-176593

(51) Int. Cl.
*G06F 3/12* (2006.01)
*H04N 1/00* (2006.01)

(52) U.S. Cl.
CPC .......... *H04N 1/001* (2013.01); *H04N 1/00477* (2013.01); *H04N 1/00973* (2013.01)

(58) Field of Classification Search
CPC ... G06F 3/1285; G06F 3/1293; G06F 3/1232; G06F 3/1237; G06F 3/1287; H04N 1/00233; H04N 1/00278; H04N 2201/0094; H04N 2201/3278; H04N 2201/0082; H04N 2201/3204; H04N 1/00; H04N 1/00244
USPC .............. 358/1.15, 1.14, 1.9; 399/82, 24, 27, 399/270, 277, 55, 66, 75, 79, 8; 709/206, 709/224
See application file for complete search history.

(56) References Cited

U.S. PATENT DOCUMENTS

| | | | | |
|---|---|---|---|---|
| 4,962,421 A | * | 10/1990 | Murai | 358/530 |
| 5,119,182 A | * | 6/1992 | Tsuboi et al. | 358/500 |
| 5,347,623 A | * | 9/1994 | Takano et al. | 715/786 |
| 5,530,673 A | * | 6/1996 | Tobita et al. | 365/185.09 |
| 5,699,494 A | * | 12/1997 | Colbert et al. | 358/1.15 |
| 5,727,135 A | * | 3/1998 | Webb et al. | 358/1.14 |
| 5,796,566 A | * | 8/1998 | Sharma et al. | 361/86 |

(Continued)

FOREIGN PATENT DOCUMENTS

| | | |
|---|---|---|
| JP | 01119170 A | 5/1989 |
| JP | 2006260379 A | 9/2006 |

*Primary Examiner* — Negussie Worku
(74) *Attorney, Agent, or Firm* — Alleman Hall McCoy Russell & Tuttle LLP

(57) ABSTRACT

An information processing apparatus includes print condition receiving portion, save information holding portion, save information re-setting portion, print data generating portion. Save information holding portion temporarily holds a set value of a predetermined setting item among setting items of print conditions that have already been received via print condition receiving portion. Save information re-setting portion, after print condition receiving portion restarts the input of the print conditions, reads out the set value held by save information holding portion and set the set value in a corresponding setting item of the print conditions. Print data generating portion, after a print execution instruction is input via print condition receiving portion, generates print data in accordance with the print conditions received by print condition receiving portion. The print data generated by print data generating portion is printed by an image forming portion of a printing apparatus.

8 Claims, 7 Drawing Sheets

(56) References Cited

U.S. PATENT DOCUMENTS

| | | | |
|---|---|---|---|
| 5,852,720 A * | 12/1998 | Gready et al. | 709/217 |
| 5,857,074 A * | 1/1999 | Johnson | 709/217 |
| 6,078,520 A * | 6/2000 | Tobita et al. | 365/185.09 |
| 6,233,634 B1 * | 5/2001 | Clark et al. | 710/313 |
| 7,054,029 B1 * | 5/2006 | Ohta et al. | 358/1.18 |
| 7,161,691 B2 * | 1/2007 | Nakagiri et al. | 358/1.13 |
| 7,564,584 B2 * | 7/2009 | Takahashi et al. | 358/2.1 |
| 2008/0008508 A1 * | 1/2008 | Mizobuchi et al. | 399/389 |
| 2008/0080001 A1 * | 4/2008 | Yamada | 358/1.15 |
| 2009/0086268 A1 * | 4/2009 | Iwashita | 358/1.15 |
| 2011/0075216 A1 * | 3/2011 | Toizumi et al. | 358/1.15 |
| 2011/0211220 A1 * | 9/2011 | Yamada | 358/1.15 |

* cited by examiner

INFORMATION PROCESSING APPARATUS, PRINTING APPARATUS, PRINTING SYSTEM, AND COMPUTER-READABLE NON-TRANSITORY STORAGE MEDIUM

INCORPORATION BY REFERENCE

This application is based upon and claims the benefit of priority from the corresponding Japanese Patent Application No. 2013-176593 filed on Aug. 28, 2013, the entire contents of which are incorporated herein by reference.

BACKGROUND

The present disclosure relates to an information processing apparatus, a printing apparatus, a printing system, and a computer-readable non-transitory storage medium.

In recent years, a printing apparatus such as a printer, a copier, a multifunction peripheral or the like is essential for the office and the like. Such a printing apparatus is configured to be operated directly by a user to perform printing or the like, as well as be used to print, on a paper sheet, image data input from an information processing apparatus, such as a personal computer, via a network, such as a LAN (Local Area Network).

In the case where the printing apparatus prints an image on a paper sheet, print conditions, such as a printing sheet size, a print density, a color mode and the like, are set for each print job. In recent years, as the number of functions provided in the printing apparatus has increased, the number of print condition items that can be set by the user for each print job has increased as well. For example, in addition to the printing sheet size, print density and color mode, the items such as an image processing for print-target image data, a print layout, processes by the finisher after printing (punching hole, staple, etc.) and the like can be set.

Since the print conditions are specified as a combination of settings for these items, a large number of print conditions can be set. In addition, since these print conditions need to be set for each application that creates print-target data in the information processing apparatus, the user needs to perform a complicated work to set the print conditions. Thus various types of typical technologies for facilitating the setting of the print conditions are known.

For example, according to a typical print setting system, print setting information of the past settings by the users is registered, and when print data is printed, print settings suited for the print data are selected from among the registered print setting information, and the selected print settings are set again as the desired printing settings.

In addition, according to a typical method, from image data composed of a plurality of pages, partial pages to be printed are specified. According to this typical method, the image data is displayed on a display, and the specified first page is stored in a memory, and all pages that are displayed following the first page are stored in the memory. Subsequently, when the user specifies a page displayed on the display as the last page, all pages stored in the memory are printed.

SUMMARY

An information processing apparatus according to one aspect of the present disclosure includes a print condition receiving portion, a save information holding portion, a save information re-setting portion, a print data generating portion, and a transmission portion. The print condition receiving portion receives input of print conditions to be used by a printing apparatus. The save information holding portion, after an instruction to temporarily save print conditions is input via the print condition receiving portion, temporarily holds a set value of a predetermined setting item among setting items of the print conditions that have already been received via the print condition receiving portion. The save information re-setting portion, after the print condition receiving portion restarts the input of the print conditions, reads out the set value held by the save information holding portion and set the set value in a corresponding setting item of the print conditions. The print data generating portion, after a print execution instruction is input via the print condition receiving portion, generates print data in accordance with the print conditions received by the print condition receiving portion. The transmission portion transmits the print data generated by the print data generating portion, to the printing apparatus.

A storage medium according to another aspect of the present disclosure is a computer-readable non-transitory storage medium for generating print data and transmitting the print data to a printing apparatus. The storage medium stores a printing program. The printing program causes the computer to execute: a step of receiving input of print conditions; a step of, after an instruction to temporarily save print conditions is input during receiving input of print conditions, temporarily storing, into a storage apparatus, a set value of a predetermined setting item among setting items of the print conditions that have already been received; a step of, after the input of the print conditions is restarted, reading out the set value from the storage apparatus and setting the set value in a corresponding setting item of the print conditions; and a step of, after a print execution instruction is input, generating print data in accordance with the received print conditions.

A printing apparatus according to a further aspect of the present disclosure includes a print condition receiving portion, a save information holding portion, a save information re-setting portion, a print data generating portion, and an image forming portion. The print condition receiving portion receives input of print conditions. The save information holding portion, after an instruction to temporarily save print conditions is input via the print condition receiving portion, temporarily holds a set value of a predetermined setting item among setting items of the print conditions that have already been received via the print condition receiving portion. The save information re-setting portion, after the print condition receiving portion restarts the input of the print conditions, reads out the set value held by the save information holding portion and set the set value in a corresponding setting item of the print conditions. The print data generating portion, after a print execution instruction is input via the print condition receiving portion, generates print data in accordance with the print conditions received by the print condition receiving portion. The image forming portion prints the print data generated by the print data generating portion.

A printing system according to a still further aspect of the present disclosure includes an information processing apparatus and a printing apparatus connected to the information processing apparatus. The information processing apparatus including: a print condition receiving portion, a save information holding portion, a save information re-setting portion, a print data generating portion, and a transmission portion. The print condition receiving portion receives input of print conditions. The save information holding portion, after an instruction to temporarily save print conditions is input via the print condition receiving portion, temporarily holds a set value of a predetermined setting item among setting items of the print conditions that have already been received via the print condition receiving portion. The save information resetting portion, after the print condition receiving portion restarts the input of the print conditions, reads out the set value held by the save information holding portion and set the set value in a corresponding setting item of the print conditions. The print data generating portion, after a print execution instruction is input via the print condition receiving portion, generates print data in accordance with the print conditions received by the print condition receiving portion. The transmission portion transmits the print data generated by the print data generating portion, to the printing apparatus. The printing apparatus includes a receiving portion and an image forming portion. The receiving portion configured to receive the print data transmitted by the information processing apparatus. The image forming portion configured to print the print data received by the receiving portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure in more detail with reference to the drawings. In the following, the present disclosure is embodied in a printing system 10 including an information processing apparatus 200 and a digital multifunction peripheral 100, wherein the information processing apparatus 200 is composed of a personal computer.

Figure 1:
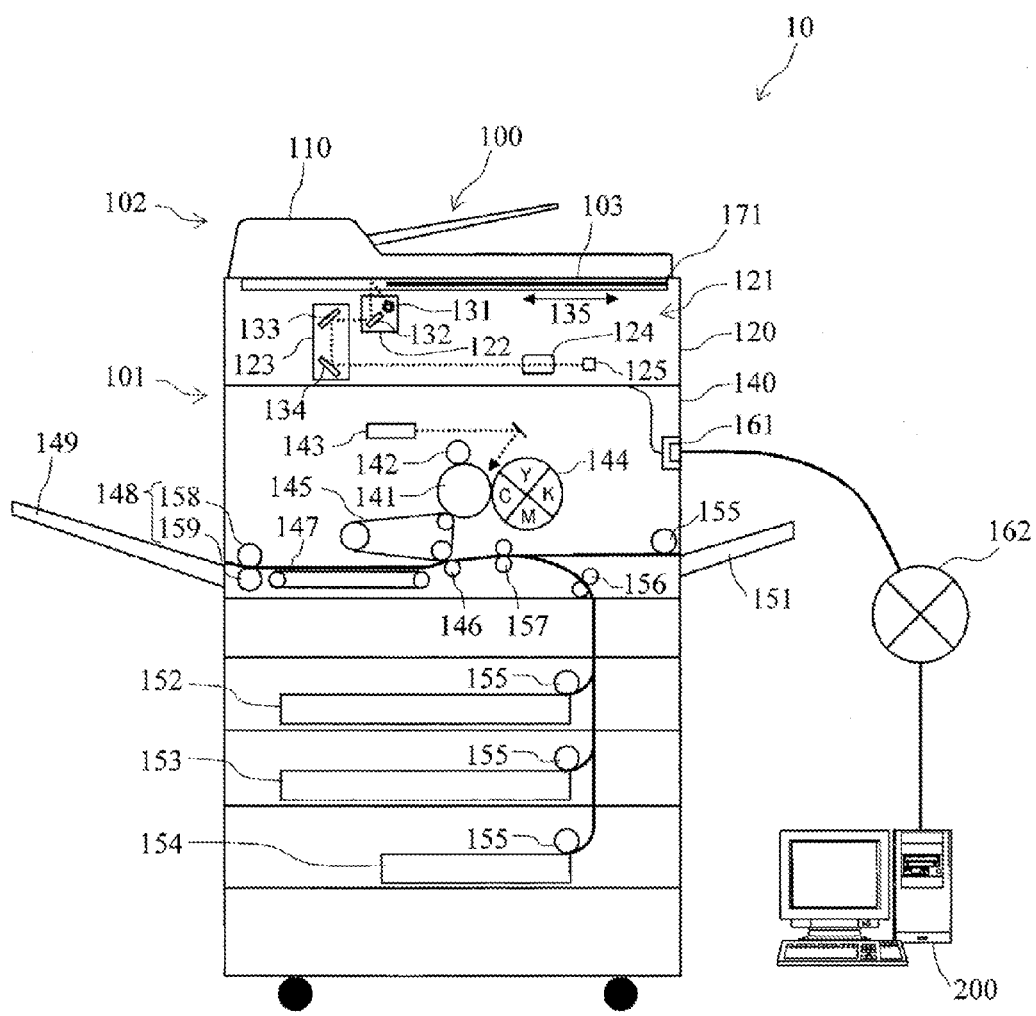
FIG. 1 shows the overall structure of the printing system in the embodiment of the present disclosure.

FIG. 1 is a diagram showing an example of the overall structure of the printing system 10 in the present embodiment. As shown in FIG. 1, the printing system 10 includes the multifunction peripheral 100 and the information processing apparatus 200.

The multifunction peripheral 100 includes a main body 101 and a platen cover 102. The main body 101 includes an image reading portion 120 and an image forming portion 140. The platen cover 102 is attached to the upper part of the main body 101. On the upper surface of the main body 101, a document sheet table 103 is provided. The document sheet table 103 is composed of a transparent plate such as contact glass. The document sheet table 103 is opened and closed by the platen cover 102. The platen cover 102 includes a document sheet conveying apparatus 110. It is noted that an operation panel 171 is provided on the front surface of the multifunction peripheral 100. With the operation panel 171, users can instruct the multifunction peripheral 100 to start copying or the like and confirm the state or setting of the multifunction peripheral 100.

The image reading portion 120 is provided below the document sheet table 103. The image reading portion 120 causes a scanning optical system 121 to read the image of the document sheet and generates the digital data (image data) of the image. The document sheet is placed on the document sheet table 103 or the document sheet conveying apparatus 110. The scanning optical system 121 includes a first carriage 122, a second carriage 123 and a condensing lens 124. The first carriage 122 includes a linear light source 131 and a mirror 132. The second carriage 123 includes mirrors 133 and 134. The light source 131 irradiates the document sheet. The mirrors 132, 133 and 134 guide reflection light from the document sheet into the condensing lens 124, and the condensing lens 124 forms an optical image thereof on a light-receiving surface of a line image sensor 125.

In the scanning optical system 121, the first carriage 122 and the second carriage 123 are provided so as to be able to reciprocate in a sub scanning direction 135. Moving the first carriage 122 and the second carriage 123 in the sub scanning direction 135 makes it possible for the image sensor 125 to read out the image of the document sheet placed on the document sheet table 103. To read an image of a document sheet set in the document sheet conveying apparatus 110, the image reading portion 120 stops the first carriage 122 and the second carriage 123 temporarily at an image reading position, and the image sensor 125 reads the image of the document sheet passing through the image reading position. The image sensor 125 generates image data of the document sheet corresponding to colors R (red), G (green) and B (blue), from the optical image incident on the light-receiving surface.

The generated image data is printed by the image forming portion 140. In addition, the generated image data may be transmitted to other apparatuses via a network interface 161 or the like and a network 162.

The image forming portion 140 prints image data onto a paper sheet, wherein the image data may be obtained by the image reading portion 120 or may be received from an external apparatus connected to the network 162, via the network interface 161. As shown in FIG. 1, as one of external apparatuses, the information processing apparatus 200 is connected to the network 162.

The image forming portion 140 includes a photoconductor drum 141. The photoconductor drum 141 rotates at a predetermined speed in one direction. Around the photoconductor drum 141, a charging device 142, an exposing device 143, a developing device 144, and an intermediate transfer belt 145 are disposed in order from the upstream side in the rotation direction. The charging device 142 charges the surface of the photoconductor drum 141 uniformly. The exposing device 143 forms an electrostatic latent image on the photoconductor drum 141 by irradiating a light beam on the uniformly charged surface of the photoconductor drum 141 in accordance with the image data. The developing device 144 forms a toner image on the photoconductor drum 141 by causing the toner to be adhered to the electrostatic latent image. The intermediate transfer belt 145 transfers the toner image on the photoconductor drum 141 onto a paper sheet. When the image data is a color image, the intermediate transfer belt 145 transfers toner images of different colors onto the same paper sheet. It is noted that color images of the RGB format are converted into image data of C (cyan), M (magenta), Y (yellow) and K (black), and the image data of these colors are input to the exposing device 143.

The image forming portion 140 feeds paper sheets one by one from a manual feed tray 151, sheet feed cassettes 152, 153, 154 or the like to a transfer portion between the intermediate transfer belt 145 and a transfer roller 146. Paper sheets of various sizes may be placed or housed in the manual feed tray 151 and the sheet feed cassettes 152, 153, and 154. The image forming portion 140 selects a paper sheet in accordance with a specification by the user or a paper sheet that corresponds to automatically detected size of the document, and causes a conveying roller 155 to feed the selected paper sheet from the manual feed tray 151 or the sheet feed cassette 152, 153, or 154. The paper sheet thus fed is conveyed by a conveying roller 156 or a resist roller 157 to the transfer portion. A toner image is transferred on the paper sheet, and the paper sheet is conveyed by a conveyance belt 147 to a fixing device 148. The fixing device 148 includes a fixing roller 158 and a pressure roller 159. The fixing roller 158 includes a heater. With this structure, the fixing device 148 fixes the toner image onto the paper sheet by heat and the pressure force. The image forming portion 140 discharges a paper sheet having passed through the fixing device 148 into a paper sheet discharge tray 149.

Figure 2:
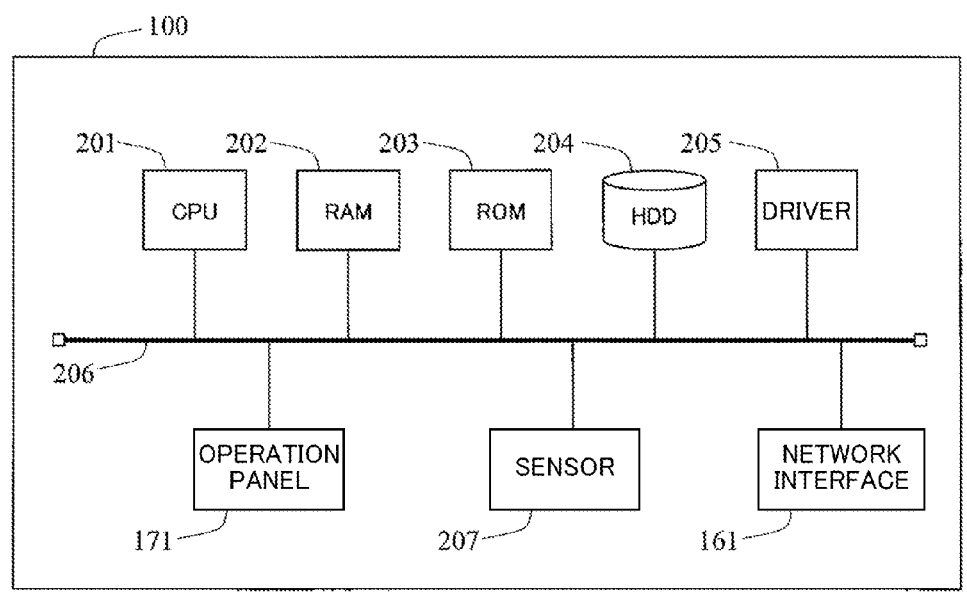
FIG. 2 shows a hardware structure of the multifunction peripheral in the embodiment of the present disclosure.

FIG. 2 is a hardware structure diagram of a control system in the multifunction peripheral. In the multifunction peripheral 100 of the present embodiment, a CPU 201, a RAM 202, a ROM 203, an HDD 204, and a driver 205 are connected via an internal bus 206, wherein the driver 205 corresponds to each driving portion in the document sheet conveying apparatus 110, image reading portion 120, and image forming portion 140. The ROM 203, HDD 204 and the like store programs. The CPU 201 controls the multifunction peripheral 100 in accordance with instructions from those control programs. For example, the CPU 201 uses the RAM 202 as a work area, and controls the operation of the above-mentioned each driving portion by sending and receiving data and instructions to/from the driver 205. In addition, the HDD 204 is used to accumulate image data obtained by the image reading portion 120 and image data received from other apparatuses via the network interface 161.

To the internal bus 206, the operation panel 171 and various types of sensors 207 are connected, as well. The operation panel 171 receives a user operation and supplies a signal to the CPU 201 in accordance with the received user operation. The operation panel 171 further displays an operation screen on a display provided therein, in accordance with a control signal from the CPU 201. The sensors 207 include various types of sensors such as an opening/closing sensor for sensing the opening/closing of the platen cover 102, a document-sheet sensor for sensing a document sheet on the document sheet table 103, a temperature sensor for sensing the temperature of the fixing device 148, and a sensor for sensing a paper sheet or document sheet being conveyed.

Figure 3:
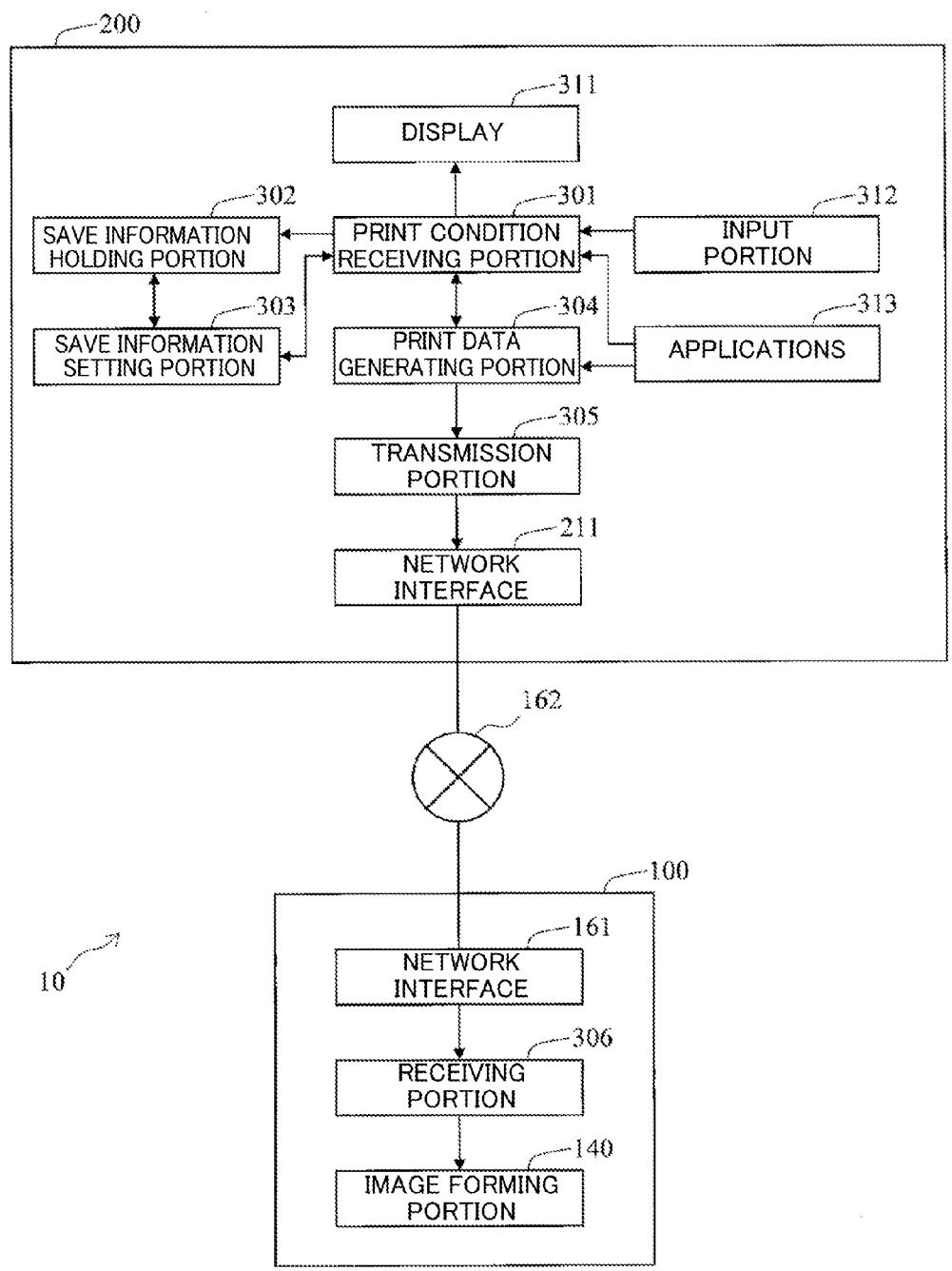
FIG. 3 shows the functions of the printing system in the embodiment of the present disclosure.

FIG. 3 is a functional block diagram of the printing system of the present embodiment. As shown in FIG. 3, in the printing system 10 of the present embodiment, the multifunction peripheral 100 and the information processing apparatus 200 are connected in the state where they can send and receive data to/from each other via the network 162.

The information processing apparatus 200 is composed of a personal computer, and is connected to the network 162 via a network interface 211. The information processing apparatus 200 includes a print condition receiving portion 301, a save information holding portion 302, a save information re-setting portion 303, a print data generating portion 304, and a transmission portion 305.

The print condition receiving portion 301 receives input of print conditions from the user. In the present embodiment, the print condition receiving portion 301 displays a print condition receiving screen on a display 311 provided in the information processing apparatus 200, and receives, as the set values of the corresponding setting items, set values that are input via the print condition receiving screen by an input portion 312 that is a keyboard or the like provided in the information processing apparatus 200.

As described below, the print condition receiving screen includes a button for inputting a print execution instruction, a button for inputting an instruction to stop input of the settings of print conditions, and a button for inputting an instruction to temporarily save print conditions. The user can input instructions to the print condition receiving portion by selecting corresponding buttons.

The save information holding portion 302, after the instruction to temporarily save print conditions is input via the print condition receiving portion 301, temporarily holds a set value of a predetermined setting item among those of the print conditions that have already been received via the print condition receiving portion 301. The predetermined setting item is any of the setting items constituting the print conditions (for example, print start page, print end page, number of print copies, image quality, etc.). The predetermined setting item may be a plurality of setting items, and may be all setting items constituting the print conditions. In addition, the predetermined setting item may be specified in advance, or may be specified by the user on the above-mentioned print condition receiving screen as appropriate. It is noted that in the following, the set values of the predetermined setting items temporarily held by the save information holding portion 302 are referred to as "temporary save data" as appropriate.

Although not limited in particular, in the present embodiment, the save information holding portion 302 stores the temporary save data in association with attribute information that identifies the print-target data. The attribute information is information for identifying the temporary save data. For example, the attribute information may include one or more of: file name; time at which print conditions are temporarily saved; and information of the print-target application. With this structure, it is possible to manage a plurality of pieces of temporary save data. It is noted that, as far as the temporary save data is associated with the attribute information, the temporary save data and the attribute information may be stored in one file or separate files.

The save information re-setting portion 303, after the print condition receiving portion 301 restarts the input of the print conditions, reads out the set values held by the save information holding portion 302, and sets the set values in the corresponding setting items of the print conditions (that is, the print conditions that are restarted to be input).

For example, after the print condition receiving portion 301 restarts the input of the print conditions, the save information re-setting portion 303 may automatically read out the set values held by the save information holding portion 302, and set the set values in the corresponding setting items of the print conditions restarted to be input. Here, the restart of the input of the print conditions by the print condition receiving portion 301 may be recognized by, for example, an instruction for the print condition receiving portion 301 to display the print condition setting screen. Alternatively, in the structure where the print condition setting screen is displayed when "PRINT" is selected in various types of applications 313 such as word processor software, spreadsheet software, drawing software and the like that are run on the information processing apparatus 200, the restart of the input of the print conditions by the print condition receiving portion 301 may be recognized by the instruction to print.

In addition, after the print condition receiving portion 301 restarts the input of the print conditions, the save information re-setting portion 303 may read out the set value held by the save information holding portion 302 in accordance with the user's input of the instruction to re-set save information, and set the set values in the corresponding setting items of the print conditions restarted to be input.

As described above, in the present embodiment, the temporary save data is stored in the save information holding portion 302 in association with the attribute information that identifies the print-target data. As a result, the save information re-setting portion 303 reads out temporary save data held by the save information holding portion 302, based on the attribute information.

The print data generating portion 304, after a print execution instruction is input via the print condition receiving portion 301, generates print data in accordance with the print conditions received by the print condition receiving portion 301. The print data generating portion 304, for example, converts the document sheet image data created by the applications 313 into print data that has been written in a predetermined PDL (Page Description Language) or the like, in accordance with the received print conditions.

It is noted that the information processing apparatus 200, as is the case with the multifunction peripheral 100, includes a CPU, a RAM, a ROM, and an HDD. The CPU realizes the print condition receiving portion 301, save information holding portion 302, save information re-setting portion 303, and print data generating portion 304 by, for example, executing programs stored in the ROM and the HDD, using the RAM as a work area. The RAM and/or the HDD may be used as the area in which the save information holding portion 302 temporarily stores a set value of a predetermined setting item.

The transmission portion 305 transmits print data generated by the print data generating portion 304, to a predetermined multifunction peripheral 100 connected to the network 162. In this example, the print data transmitted from the information processing apparatus 200 by the transmission portion 305 is received by a receiving portion 306 of the multifunction peripheral 100, and the print data is printed by the image forming portion 140.

Meanwhile, when the user is to set print conditions for printing by the multifunction peripheral 100, the user activates a printer driver (a printing program) on an application that is creating print-target data, and, via an input screen displayed by the printer driver, inputs set values for the setting items that constitute the print conditions. For example, when, among a series of data composed of a plurality of pages created on the application, only a partial series of pages are to be printed, the user sets the page numbers of the print start page and the print end page, as the print conditions.

Under such a situation, the user confirms and memorizes the page numbers of the print start page and the print end page in advance on the application, and sets the page numbers on the input screen of the printer driver. However, when there are a lot of numerals to be memorized due to a lot of print-target pages, a large number of digits in page number or the like, the user may forget the number or become uncertain whether the number is correct during the process of activating the printer driver and causing it to display the input screen.

In that case, the user would cancel the input of the print conditions, end the printer driver, re-confirm the page numbers on the application, re-activate the printer driver, and re-set the print conditions. When the printer driver is re-activated, the set values of the setting items constituting the print conditions become the default values, and the user needs to restart the setting of the print conditions from the beginning.

The present disclosure provides a structure where, even when the input of settings is stopped in the middle of the print condition setting, a predetermined process is performed in accordance with the print condition saving procedure described below. This enables the input of the settings of print conditions to be restarted easily without restarting it from the beginning. The following explains the print condition saving procedure.

Figure 4:
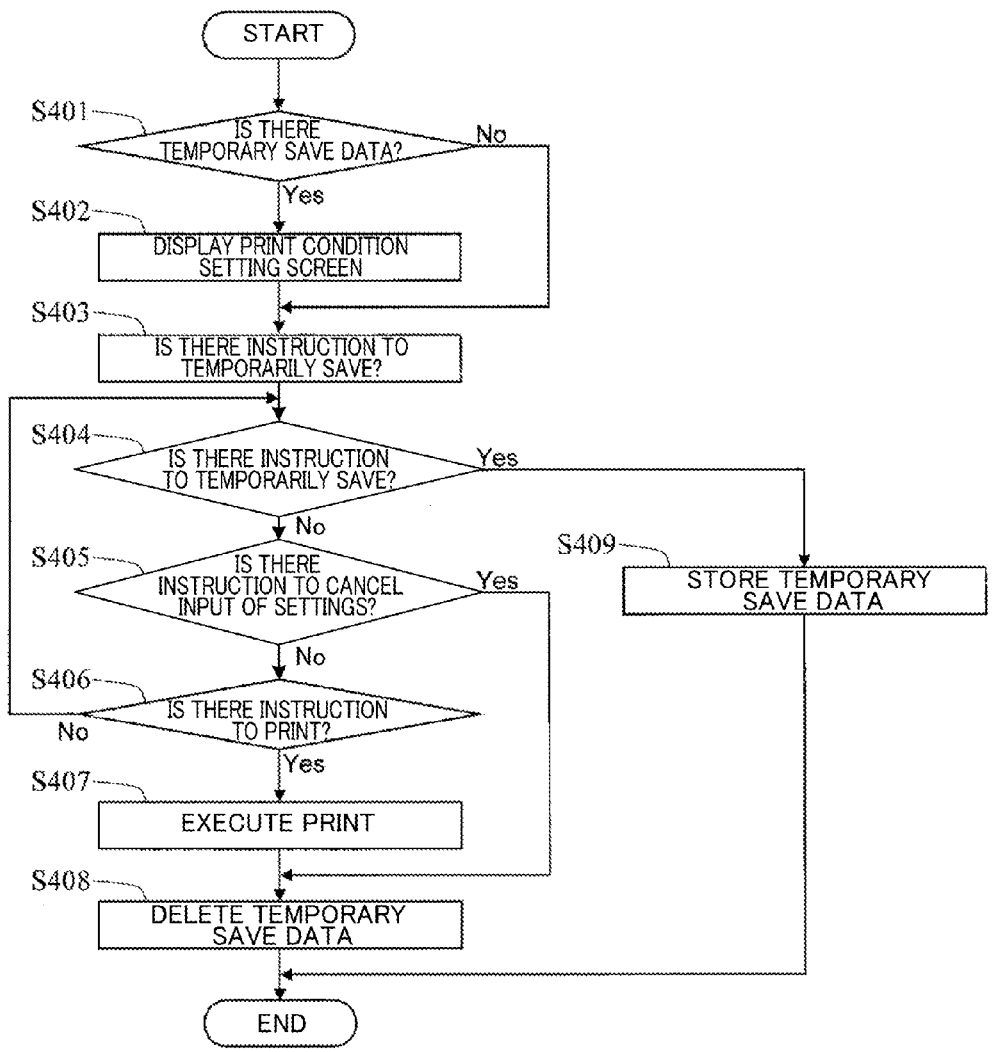
FIG. 4 is a flowchart showing an example of the print condition saving procedure performed by the printing system in the embodiment of the present disclosure.

FIG. 4 is a flowchart showing an example of the print condition saving procedure performed by the printing system 10. This procedure is started when triggered by, for example, a selection of the print in any of the applications 313 that makes the print condition receiving portion 301 ready to receive input of the settings of print conditions. In the case of the following explanation, the print start page and the print end page are input in the information processing apparatus 200.

When this procedure is started, the print condition receiving portion 301 displays the print condition setting screen on the display 311 (step S401 No, S403). At this time, the print condition receiving portion 301 confirms with the save information re-setting portion 303 whether or not there is temporary save data that is to be re-set. Here, the temporary save data has not been stored in the save information holding portion 302. As a result, the print condition receiving portion 301 displays the print condition setting screen on the display 311 in the state where set values for the setting items constituting the print conditions are default values.

Figure 5:
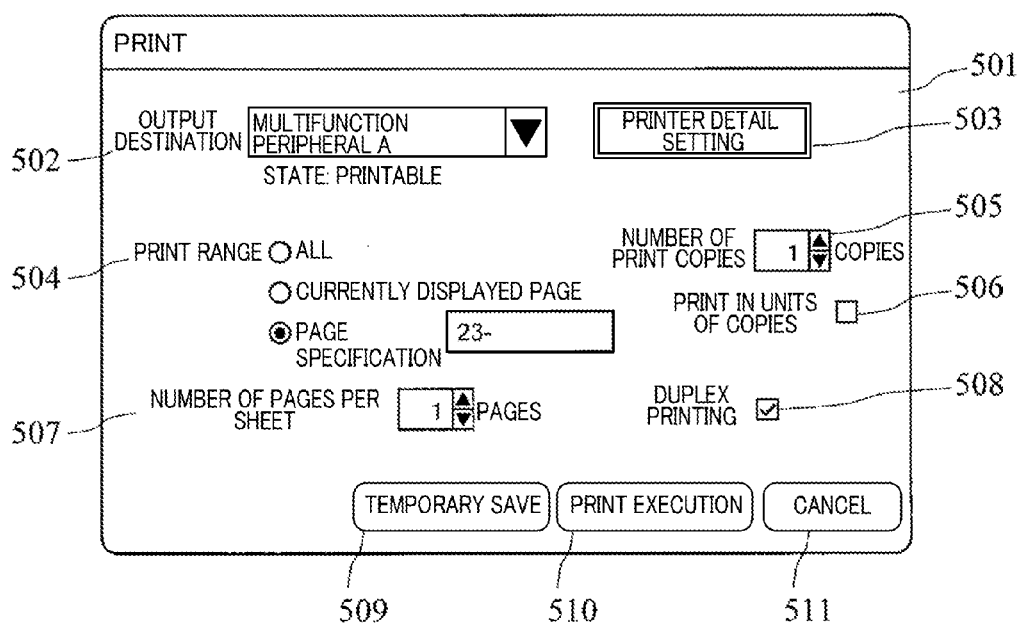
FIG. 5 shows one example of the print condition setting screen displayed by the information processing apparatus in the embodiment of the present disclosure.

FIG. 5 is a diagram showing one example of the print condition setting screen displayed by the print condition receiving portion 301 on the display 311 of the information processing apparatus 200. In this example, a print condition setting screen 501 includes an output destination selection field 502, a "printer detail setting" button 503, a print range setting field 504, a print copy number setting field 505, a print unit specifying field 506, a collective setting specifying field 507, a duplex printing specifying field 508, a "temporary save" button 509, a "print execution" button 510, and a "cancel" button 511.

The output destination selection field 502 is used by the user to specify the output destination (a device used for the printing). In this example, the output destination selection field 502 is provided in the form of a list box. When the downward triangle mark provided at the right end of the field 502 is selected, a list of devices that can be selected at the time is displayed. In this example, it is presumed that the multifunction peripheral 100 is specified as the output destination.

The "printer detail setting" button 503 is used to perform detailed settings of the device selected in the output destination selection field 502. The detailed settings are, for example, print density, print sheet for use, enlarging/reducing and the like. These settings are reflected in the print data.

The print range setting field 504 is used to specify a print range. In this example, the print range setting field 504 is provided in the form of a radio button where one of "all", "currently displayed page" and "page specification" can be selected. When the user selects "page specification", the user specifies pages for printing by inputting page numbers to be printed or a pair of a print start page and a print end page, into the text box disposed on the right side thereof.

The print copy number setting field 505 is used to specify the number of print copies. The print unit specifying field 506 is provided in the form of a check box. When the check box is in the checked state, and a plurality of print copies is specified in the print copy number setting field 505, the printing is performed in units of the number of print copies.

The collective setting specifying field 507 is used to specify a collective printing. The number of pages to be printed per sheet is specified in the collective setting specifying field 507. That is, when "2" is specified in the collective setting specifying field 507, a "2in1" printing (printing two pages in one paper sheet) is performed, and when "4" is specified in the collective setting specifying field 507, a "4in1" printing (printing four pages in one paper sheet) is performed. The duplex printing specifying field 508 is provided in the form of a check box, and when this check box is in the checked state, printing is performed on both of the front and rear surfaces of each paper sheet.

The "temporary save" button 509 is used to temporarily save a set value of a predetermined setting item among the print conditions having been set via the print condition setting screen 501. The "print execution" button 510 is used to execute a print after completing input of the settings of print conditions. The "cancel" button 511 is used to cancel the input of the settings of print conditions and end the procedure. Until the user selects any of the "temporary save" button 509, "print execution" button 510 and "cancel" button 511, the user can perform the input of the settings of print conditions on the print condition setting screen 501 (step S404 No, S405 No, S406 No).

When the user selects the "temporary save" button 509, the save information holding portion 302 stores and holds the temporary save data (step S404 Yes, S409). Although not limited in particular, in this example, the set values of the print range setting field 504 and the duplex printing specifying field 508 are specified as the temporary save data in advance.

In addition, in this example, time at which the print conditions are temporarily saved and information of the application 313 are adopted as the attribute information that is stored in association with the temporary save data. For example, when the application 313 is spreadsheet software, the save information holding portion 302 stores, as the attribute information, information identifying the spreadsheet software (for example, the name of the software) and the time of the temporary save, in association with the temporary save data.

Although not limited in particular, in this example, the temporary save data and the attribute information are stored as separate files. In addition, in the file of the attribute information, information identifying the file of the corresponding temporary save data is recorded. It is noted that, for example, the files of the attribute information and temporary save data may be stored in different directories, or different file names may be assigned to the files when they are stored so that the files of the temporary save data and attribute information are stored for each device that is selected in the output destination selection field 502.

In the example shown in FIG. 5, in the print range setting field 504, the user has selected "page specification" and has input "23-" to specify the print range (specifying page "23" as the print start page). In addition, the user has made the check box into the checked state in the duplex printing specifying field 508.

Suppose that, in this situation, the user wants to input the print end page, but is uncertain whether the print end page, which he/she has confirmed immediately before, is correct. In this case, the user can select the "temporary save" button 509. When the user selects the "temporary save" button 509, the save information holding portion 302 stores the temporary save data in association with the above-mentioned attribute information, wherein the temporary save data is the set values of the print range setting field 504 and the duplex printing specifying field 508 that are specifically the selection of "page specification", input of "23-" as the print range, and the checked state. The procedure is once ended when the temporary save data is completely stored in the save information holding portion 302. In this situation, the user can confirm the print end page by operating the applications 313.

When the user confirms the print end page and selects the print in any of the applications 313, the procedure shown in FIG. 4 is restarted. Here, the print condition receiving portion 301 confirms with the save information re-setting portion 303 whether or not there is temporary save data to be re-set (step S401). The save information re-setting portion 303 retrieves the attribute information stored in the save information holding portion 302, based on the information identifying the application 313 in which the print was selected, and the time of the retrieval. Although not limited in particular, in this example, the save information re-setting portion 303 retrieves the attribute information stored in the save information holding portion 302 by adopting the condition, as the retrieval condition, that the print was selected in the same application and the attribute information was stored in the save information holding portion 302 within a predetermined time period (for example, ten minutes) before the time of the retrieval.

For example, if the above-mentioned temporary save data was stored five minutes before the time of the retrieval, the above-mentioned temporary save data satisfies the retrieval condition. As a result, the save information re-setting portion 303 determines that there is temporary save data to be re-set, reads out temporary save data stored in the save information holding portion 302 in association with the attribute information, and sets the set values recorded as the temporary save data, as the set values of the corresponding setting items (step S401 Yes, S402). In this example, this re-setting re-sets the set values, that is, selection of "page specification" and input of "23-" as the print range in the print range setting field 504, and the check box in the checked state in the duplex printing specifying field 508.

As a result, in the print condition setting screen 501 displayed by the print condition receiving portion 301 on the display 311, as shown in FIG. 5, the set values have been set in the print range setting field 504 and the duplex printing specifying field 508. Accordingly, the user does not need to restart the setting of the print conditions from the beginning, but has only to input the confirmed print end page into the print range setting field 504. For example, if the print end page is page 47, the user has only to input the print range setting field 504 as "23-47".

It is noted that, as described above, in this example, the temporary save data is the set values of the print range setting field 504 and the duplex printing specifying field 508. As a result, for example, even when "2in1" was set in the collective setting specifying field 507 when the temporary save data was stored, the set value of the collective setting specifying field 507 in the print condition setting screen 501 is a default value (1in1) after the temporary save data is re-set.

When the user inputs the print end page in the print range setting field 504 and selects the "print execution" button 510 in the print condition setting screen 501, the print is executed (step S404 No, S405 No, S406 Yes, S407). At this time, the print condition receiving portion 301 inputs the print conditions, for which the settings have been input, into the print data generating portion 304. In accordance with the input print conditions, the print data generating portion 304 obtains image data from the application 313 and generates print data according to the input print conditions. In this example, print data for printing image data of page 23 to page 47 in 1in1, for one copy and in duplex printing is generated.

After completing the generation of the print data, the print data generating portion 304 transmits the print data to the multifunction peripheral 100, which has been specified as the output destination, via the network interface 211. Upon receiving the print data via the network 162 and the network interface 161, the receiving portion 306 inputs the received print data into the image forming portion 140. This causes the multifunction peripheral 100 to print the print data.

On the other hand, after inputting the print data into the transmission portion 305, the print data generating portion 304 notifies the print condition receiving portion 301 of the inputting. In accordance with this notification, the print condition receiving portion 301 instructs the save information re-setting portion 303 to delete the temporary save data that was read out in the previous step. Upon receiving the instruction, the save information re-setting portion 303 deletes the temporary save data that was read out in the previous step, from the save information holding portion 302 (step S408).

When the user, who has input the print end page into the print range setting field 504, selects the "cancel" button 511 in the print condition setting screen 501, the input of the settings of print conditions is cancelled (step S404 No, S405 Yes). At this time, the print condition receiving portion 301 instructs the save information re-setting portion 303 to delete the temporary save data that was read out in the previous step. Upon receiving the instruction, the save information re-setting portion 303 deletes the temporary save data that was read out in the previous step, from the save information holding portion 302 (step S408).

Figure 6:
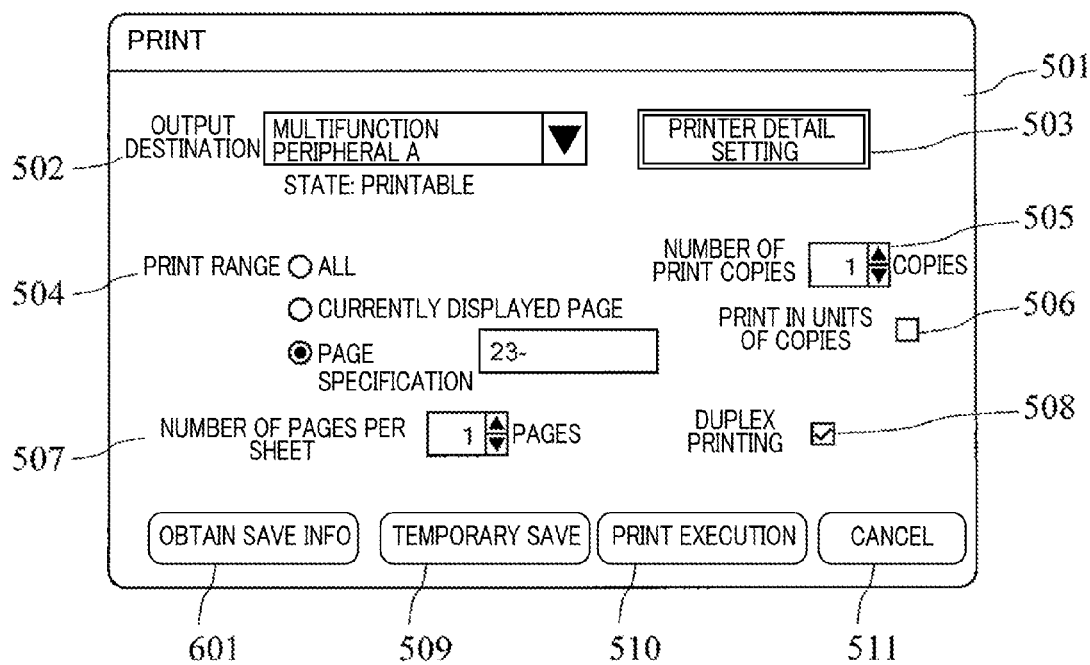
FIG. 6 shows another example of the print condition setting screen displayed by the information processing apparatus in the embodiment of the present disclosure.

It is noted that in the present embodiment, when the print condition receiving portion 301 displays the print condition setting screen 501, it automatically retrieves and obtains the temporary save data. However, the present disclosure is not limited to this structure. The present disclosure may have a structure where the temporary save data is obtained in accordance with the instruction from the user. Such a structure can be easily realized by, for example, providing a "obtain save information" button 601 in the print condition setting screen 501, as shown in FIG. 6. With this structure, when the user selects the "obtain save information" button 601 in the print condition setting screen 501, the retrieval and re-setting of the temporary save data are implemented.

Figure 7:
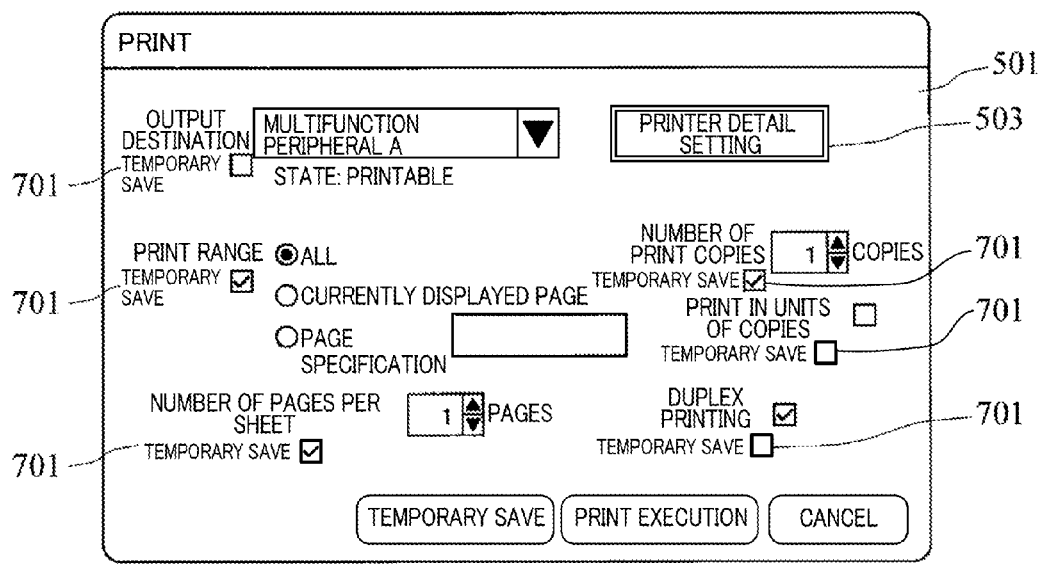
FIG. 7 shows a further example of the print condition setting screen displayed by the information processing apparatus in the embodiment of the present disclosure.

In addition, although the present embodiment has a structure where the setting items of print conditions to be stored in the save information holding portion 302 are specified in advance, these setting items may be identified in accordance with the instruction from the user. Such a structure can be easily realized by, for example, providing a temporary storage specifying field 701 in each setting item of the the print condition setting screen 501, as shown in FIG. 7. In the example shown in FIG. 7, the temporary storage specifying field 701 is provided in the form of a check box, and the set values of the setting items whose check boxes are in the checked state are stored in the save information holding portion 302. It is noted that although in this example, the temporary storage specifying field 701 is provided in each of the setting items including the detail setting items that are displayed when the "printer detail setting" button 503 is selected, the temporary storage specifying field 701 may be provided only in part of these setting items. In addition, the present disclosure may adopt a structure where, when the user changes a set value of a certain setting item from the default value to a certain set value in the print condition setting screen 501, the temporary storage specifying field 701 of this setting item is automatically made into the checked state.

In the above-described printing system 10, with regard to the print conditions that have already been received via the print condition receiving portion 301, it is possible to temporarily hold set values of predetermined setting items in accordance with an instruction from the user. The set values thus held can be set in the corresponding setting items when the input of the print conditions is restarted. With this structure, the user can easily restart the input of the print conditions. Accordingly, the user does not need to restart the setting of the print conditions from the beginning.

Furthermore, in the above-described printing system 10, the temporary save data is stored in association with the attribute information. As a result, for example, the temporary save data can be stored for each application 313 or for each print-target file.

Furthermore, in the above-described printing system 10, after a print execution instruction is input via the print condition receiving portion, or after a print cancel instruction is input via the print condition receiving portion 301, the save information holding portion 302 deletes the corresponding set values. This restricts the accumulation of unnecessary temporary save data and attribute information. It is noted that since the above-described embodiment has a structure where temporary save data is read out if it was stored within a predetermined time period before the current time, it is possible to adopt a structure where temporary save data and attribute information are automatically deleted after the elapse of the predetermined time period since the storage thereof.

It is noted that the above-described embodiment does not restrict the technical scope of the present disclosure, but various modifications and applications, other than those that have already been described, are possible within the scope of the present disclosure. For example, although in the above-described embodiment, the save information holding portion 302 is provided in the information processing apparatus 200, the save information holding portion 302 may be provided in the multifunction peripheral 100. In that case, the temporary save data and the attribute information, for example, may be stored in different directories, or different file names may be assigned to the files when they are stored so that the files of the temporary save data and attribute information may be stored for each information processing apparatus 200.

Furthermore, although in the above-described embodiment, the temporary save data is stored in association with the attribute information, only the temporary save data may be stored. Even with this structure, the set values held as the temporary save data can be set in the corresponding setting items after the input of the print conditions is restarted.

Furthermore, in the flowchart shown in FIG. 4, the order of the steps may be changed as appropriate in such a range that equivalent acts are provided. For example, in FIG. 4, the temporary save data is deleted after the printing is executed. However, the same effects are produced by a structure where temporary save data is deleted after the temporary save data is read out.

Furthermore, in the above-described embodiment, the present disclosure is provided concretely as the printing system 10 including the digital multifunction peripheral 100. However, not limited to the digital multifunction peripheral 100, the present disclosure is applicable to a printing system including an arbitrary printing apparatus such as a printer, a copier or the like.

Furthermore, the above-described embodiment explains a structure where the information processing apparatus 200 includes all of the print condition receiving portion, save information holding portion, save information re-setting portion, and print data generating portion. However, these portions may be provided in the multifunction peripheral 100 that functions as a printing apparatus. In that case, the settings of print conditions may be input via a display of the multifunction peripheral 100, or may be input via a display of the information processing apparatus 200. Such a structure produces effects similar to the above-described effects when the printing apparatus functions as a document sheet image accumulating apparatus as well.

According to the present disclosure, even when the input of settings is stopped in the middle of the print condition setting, the input of the settings of print conditions can be restarted easily. The present disclosure, therefore, is useful as an information processing apparatus, a printing program, a printing apparatus storing the printing program, and a printing system.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
   a print condition receiving portion, executed on a processor of the apparatus, that performs a process of receiving input of print conditions to be used by a printing apparatus, input of an instruction to temporarily save the print conditions, and input of a print execution instruction via a print condition receiving screen that includes setting items constituting the print conditions;
   a save information holding portion, executed on the processor, that performs a process of, after input of the instruction to temporarily save the print conditions is received via the print condition receiving portion, holding a set value of at least one predetermined setting item among setting items of the print conditions that have already been received via the print condition receiving portion, by temporarily storing the set value in a storage device;
   a save information re-setting portion, executed on the processor, that performs a process of, when, after input of the print conditions on the print condition receiving screen is stopped upon the input of the instruction to temporarily save the print conditions, the input of the print conditions on the print condition receiving screen is restarted, reading out the set value held by the save information holding portion from the storage device and resetting the set value in a corresponding setting item of the print conditions on the print condition receiving screen;
   a print data generating portion, executed on the processor, that performs a process of, after input of a print execution instruction is received by the print condition receiving portion, generating print data in accordance with the print conditions received by the print condition receiving portion; and
   a transmission portion, executed on the processor, configured to transmit the print data generated by the print data generating portion, to the printing apparatus.

2. The information processing apparatus according to claim 1, wherein
   the set value that is temporarily held by the save information holding portion is stored in association with attribute information that identifies print-target data, and the save information re-setting portion reads out the set value from the save information holding portion from the storage device based on the attribute information.

3. The information processing apparatus according to claim 1, wherein
   the attribute information includes a file name, a time at which the print conditions are temporarily saved, or information of a print-target application.

4. The information processing apparatus according to claim 1, wherein
   after the print execution instruction is input via the print condition receiving screen, generating print data in accordance with the print conditions received by the print condition receiving portion; and
   a print data generating portion configured to, after input of a print execution instruction is received by the print condition receiving portion, or after a print cancel instruction is received by the print condition receiving portion, the save information holding portion deletes corresponding set values.

5. The information processing apparatus according to claim 1, wherein
   a storage portion included in the printing apparatus is used as the save information holding portion.

6. A computer-readable non-transitory storage medium for generating print data and transmitting the print data to a printing apparatus, the storage medium storing a printing program that causes the computer to execute:
   a step of receiving input of print conditions to be used by a printing apparatus, input of an instruction to temporarily save the print conditions, and input of a print execution instruction via a print condition receiving screen that includes setting items constituting the print conditions;
   a step of, after input of the instruction to temporarily save the print conditions is received during the step of receiving input of print conditions, holding a set value of at least one predetermined setting item among setting items of the print conditions that have already been received, by temporarily storing the set value in a storage device;
   a step of, after the input of the print conditions on the print condition receiving screen is restarted, reading out the set value from the storage device and resetting the set value in a corresponding setting item of the print conditions on the print condition receiving screen; and
   a step of, after a print execution instruction is received, generating print data in accordance with the received print conditions.

7. A printing apparatus comprising:
   a print condition receiving portion, executed on a processor of the apparatus, that performs a process of receiving input of print conditions;
   a save information holding portion, executed on the processor, that performs a process of, after input of the instruction to temporarily save the print conditions is received via the print condition receiving portion, holding a set value of at least one predetermined setting item among setting items of the print conditions that have already been received via the print condition receiving portion, by temporarily storing the set value in a storage device;
   a save information re-setting portion, executed on the processor, that performs a process of, when, after input of the print conditions on the print condition receiving screen is stopped upon the input of the instruction to temporarily save the print conditions, the input of the print conditions on the print condition receiving screen is restarted, reading out the set value held by the save information holding portion from the storage device and resetting the set value in a corresponding setting item of the print conditions on the print condition receiving screen;

a print data generating portion, executed on the processor, that performs a process of, after input of a print execution instruction is received by the print condition receiving portion, generating print data in accordance with the print conditions received by the print condition receiving portion; and an image forming portion configured to print the print data generated by the print data generating portion.

8. A printing system comprising an information processing apparatus and a printing apparatus connected to the information processing apparatus, the information processing apparatus including:

a print condition receiving portion, executed on a processor of the apparatus, that performs a process of receiving input of print conditions to be used by a printing apparatus, input of an instruction to temporarily save the print conditions, and input of a print execution instruction via a print condition receiving screen that includes setting items constituting the print conditions;

a save information holding portion, executed on the processor, that performs a process of, after input of the instruction to temporarily save the print conditions is received via the print condition receiving portion, holding a set value of at least one predetermined setting item among setting items of the print conditions that have already been received via the print condition receiving portion, by temporarily storing the set value in a storage device;

a save information re-setting portion, executed on the processor, that performs a process of, when, after input of the print conditions on the print condition receiving screen is stopped upon the input of the instruction to temporarily save the print conditions, the input of the print conditions on the print condition receiving screen is restarted, reading out the set value held by the save information holding portion from the storage device and resetting the set value in a corresponding setting item of the print conditions on the print condition receiving screen;

a print data generating portion, executed on the processor, that performs a process of, after input of a print execution instruction is received by the print condition receiving portion, generating print data in accordance with the print conditions received by the print condition receiving portion; and a transmission portion, executed on the processor, configured to transmit the print data generated by the print data generating portion, to the printing apparatus, the printing apparatus including:

a receiving portion configured to receive the print data transmitted by the information processing apparatus; and an image forming portion configured to print the print data received by the receiving portion.

* * * * *